April 17, 1945.   I. L. WOLK ET AL   2,374,151
CATALYTIC CONVERSION AND REGENERATION SYSTEM
Filed March 15, 1943
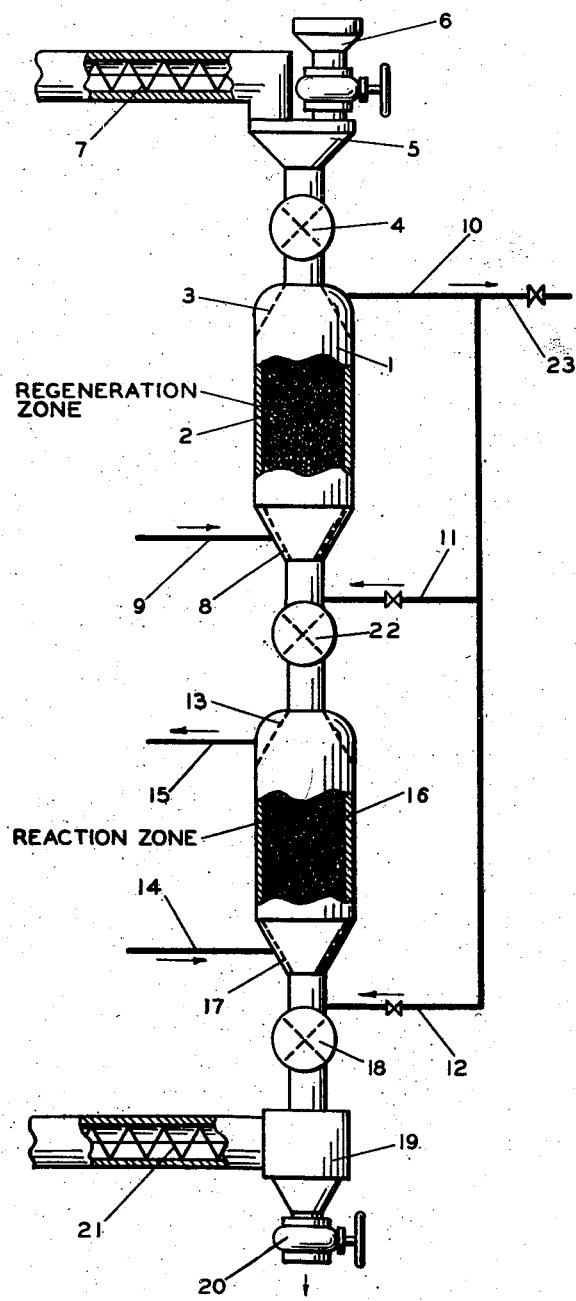
INVENTORS-
I. LOUIS WOLK
JOHN D. UPHAM
BY Hudson, Young & Yinger
ATTORNEYS.

Patented Apr. 17, 1945

2,374,151

UNITED STATES PATENT OFFICE 2,374,151

CATALYTIC CONVERSION AND REGENERATION SYSTEM

I. Louis Wolk and John D. Upham, Bartlesville, Okla., assignors to Phillips Petroleum Company, a corporation of Delaware Application March 15, 1943, Serial No. 479,265

4 Claims. (Cl. 196—52)

The present invention relates to a method and apparatus for catalytic conversion of hydrocarbons in which the catalyst is deactivated by deposition or accumulation thereon of carbonaceous or hydrocarbon-containing material which must be periodically removed, as by oxidation. More particularly it relates to an improved method and apparatus for carrying out this type of conversion, in which the catalyst moves continuously or intermittently through a conversion zone and through a regeneration zone.

In processes of the type described, the catalyst flowing from the reaction zone carries with it, by adsorption or otherwise, hydrocarbon materials which may include unreacted or partially reacted material as well as reaction products. In order to carry out the regeneration effectively it is desirable to remove or purge these hydrocarbon materials from the catalyst prior to regeneration proper. This is ordinarily effected by sweeping the catalyst as it leaves the reaction zone with steam or other gas. The regenerated catalyst must also be purged prior to reentering the reaction zone in order to remove adsorbed regeneration gases and especially adsorbed oxygen or excess amounts of reactive oxygen compounds carried by the catalyst.

Conventional methods which utilize steam or other gases for purging have the disadvantage that temperature of the catalyst bed is reduced if these gases are utilized at lower temperatures, or additional heat is required to preheat these gases to the desired catalyst temperature. Furthermore hydrocarbons and other reactive adsorbed materials may be wasted or rendered difficult to recover if carried off with the purge gas. In addition, substantial heat is required for the generation of the steam.

It is a principal object of the present invention to provide a method and apparatus for carrying out conversions of the type described, using a moving catalyst bed, in a novel and efficient manner, whereby effective provision is made for the purging and removal of impurities carried or adsorbed by the catalyst during regeneration and reaction. More particularly, this is accomplished without substantial heat loss and is accompanied by recovery of valuable adsorbed materials which might ordinarily be lost.

A specific object of this invention is the provision of a catalytic cracking and catalyst regeneration process utilizing a moving or flowing catalyst bed in which the catalyst flowing between the respective zones is purged of impurities by the use of purging gas prepared and conditioned for such use in the regeneration zone.

Further objects and applications of the present invention will become apparent in the following description.

In accordance with the invention described herein both regenerated and deactivated catalyst utilized in a moving bed type of catalytic operation are each purged by means of hot oxygen-free gases which are prepared within the system by flowing the regeneration gases countercurrent to the moving bed of catalyst in the regeneration zone, the conditions of regeneration being so adjusted that the spent regeneration gas is substantially oxygen-free. This oxygen-free gas is then utilized for purging by introducing portions of it into the regeneration and reaction zones in contact with the catalyst leaving said zones at points below the points of introduction of regeneration gas and feed respectively, and in a manner which will permit reintroduction of purged material into the respective zones.

The process and apparatus are exemplified in the drawing as applied to a conventional flowing catalyst bed type catalytic reaction. For purposes of illustration the process described will relate to a catalytic cracking operation, but the invention in question is applicable to any hydrocarbon conversion reaction in which catalyst is deactivated by contamination with carbonaceous material and is regenerated by combustion of such material. Such reactions include dehydrogenation, cyclization, aromatization, reforming, hydroforming, etc., as well as cracking. While it is ordinarily preferred to perform these reactions in vapor phase, liquid phase operation at elevated temperatures and higher pressures may also be carried out in accordance with the present invention.

In the drawing, which represents a partial cross-section of a typical apparatus which may be utilized in the process, deactivated catalyst 2 flows downwardly through a regeneration zone 1. The catalyst may be one commonly used in cracking reactions, including natural or synthetic clays such as bentonite or "Super Filtrol," or other catalysts such as bauxite, alumina-silica or the like. Preferably the catalyst is in the form of granules having a particle size of 4–60 mesh. The catalyst is introduced via rotary valve 4, or other suitable device, through a perforated conical member 3 which provides a free space to permit ready removal of gases. A regenerating gas such as air or air and flue gas or the like containing a predetermined amount of oxygen is introduced through line 9, preferably at or near ignition temperatures, say 800° F. This gas flows upward, countercurrent to the stream of catalyst. In accordance with one of the features of the present invention the oxygen content and rate and volume of feed of the gas are so coordinated to the amount of catalyst being treated in zone 1 and the carbon content thereof, that the spent regeneration gas removed via 10 will be substantially oxygen-free. In view of the fact that the flow of catalyst and regeneration gas is countercurrent, the catalyst leaving the regeneration zone may be completely regenerated since it must flow through a region of higher oxygen content; by the same token, the gases leaving the regeneration zone flow through a region of excess carbon content so that they will have substantially zero oxygen content on leaving the regeneration zone.

While air may itself serve as a regenerating gas, it is ordinarily preferred to utilize gases having a controlled lower oxygen content. Concentrations of 2 to 10% oxygen have been found to be suitable and these gas mixtures may be obtained by admixing controlled amounts of oxygen with an inert gas or oxygen-free combustion gas. These gas mixtures may also be obtained by combustion of fuel in the presence of a controlled excess of air.

The amount of oxygen introduced into the regeneration zone should not exceed the stoichiometric proportion required to react with all of the carbon in the regeneration zone per unit of time. Preferably this amount should be somewhat less than this in order to ensure the effluent gas being oxygen-free. It has been found that a small proportion of the carbon may be allowed to remain on the regenerated catalyst without impairing the efficiency of the conversion unduly. In a reaction of the type described, the deactivated catalyst may, for example, contain about 3% carbon by weight. This will require approximately 38,000 standard cubic feet of gas containing 5% oxygen to completely oxidize the carbon on one ton of deactivated catalyst to carbon dioxide. Somewhat less than this may be required, depending upon the amount of carbon monoxide formation and other side reactions occurring. With a catalyst flow rate of ½ ton per hour through a regeneration chamber containing 1 ton of catalyst this will mean that the flow rate of 5% regeneration gas should be 19,000 cubic feet per hour or somewhat less. In any event the determination of the volume and concentration of oxygen-containing gas may be readily coordinated to the rate of flow of catalyst and carbon concentration thereof by determining the point at which oxygen begins to appear in the effluent and then cutting down on either flow rate or oxygen content.

The hot regenerated catalyst leaves the regeneration zone through perforated hopper 8. At this point it is somewhat below maximum regeneration temperature due to contact with the gas introduced via line 9 but it is still somewhat above the desired reaction temperature. In a typical regeneration operation the temperature in the hotter portion of the zone will be from 1200 F.–1350 F., but the catalyst after contacting the lower temperature regeneration gas near its inlet will have a temperature in the range of 1000 F.–1100 F. The catalyst leaving the hopper is then contacted with a portion of the oxygen-free spent regeneration gas produced as described above, which is introduced via line 11 at a point above the catalyst outlet and below the regeneration gas inlet. The region between the point of introduction of spent oxygen-free regeneration gas and the regeneration gas inlet thus defines a purging zone in open communication with the regeneration zone in which the oxygen-free gas serves to purge the regenerated catalyst of adsorbed oxygen and undesirable oxygen-containing components, carrying them on up into the regeneration zone.

The regenerated and purged catalyst is fed into reaction zone 16 by rotary valve 22 through perforated hopper 13 and flows countercurrent to a stream of hydrocarbon feed to be cracked introduced through line 14. The cracked reaction products are removed through the perforations in 13 and line 15 and go to suitable fractionating equipment for separation of gasoline and light and heavy fractions as is conventional in the art. The deactivated catalyst is removed via perforated hopper 17. At this stage, another portion of the oxygen-free gas from 10 is introduced via line 12 at a point above the catalyst outlet and below the feed inlet for the purpose of purging the catalyst of adsorbed hydrocarbons. The region between the point of introduction of oxygen-free gas and the feed inlet thus defines a purging zone in open communication with the reaction zone, the adsorbed hydrocarbons being thereby reintroduced into the reaction zone for further treatment along with the purge gas and the feed. This purge gas, being at a temperature higher than that of the feed will also supply heat to the reaction zone. The proportion of purge gas required for each zone will be variable, but ordinarily a volume corresponding to 5 to 50% of the volume of feed on the one hand, and regenerating gas on the other, will be suitable.

The deactivated and purged catalyst is removed via rotary valve 18 into chamber 19, and from this chamber is returned to the regeneration zone via conveyors 21 and 7 into hopper 5. Fresh make-up catalyst may be introduced through feed hopper 6 and spent catalyst may be removed through valve 20. Any portion of the spent regeneration gas may be removed as desired through line 23.

In the above described operation it should be noted that the purging operation conducted in regeneration zone 1 may have a dual function; the oxygen-free gas introduced via line 11 purges the regenerated material of adsorbed oxygen, etc., while the oxygen-free gas leaving the zone will serve to purge unregenerated catalyst entering the regeneration zone of hydrocarbons and the like, should any remain on the catalyst after leaving the reaction zone. This feature will permit, as an alternative, elimination of the purging via line 12 of catalyst leaving reactor 16 as shown. In such case, however, it will be desirable to periodically or continuously reduce the hydrocarbon content of the gas leaving via line 10, as by interposing a cooling and separating step to remove these hydrocarbons prior to use of the gas for purging. One method of removing the hydrocarbonaceous material referred to is by burning it in the effluent flue gas in a separate zone in the presence of added oxygen, using a catalyst such as copper chromite or the like if desired. By using a predetermined excess of oxygen or air a desirable regeneration gas may be prepared. Another method is to introduce the hydrocarbon-containing purge gas into the reaction zone along with the feed, using the heat content of this gas at the same time to preheat the feed by direct heat exchange, and separating gas from hydrocarbon products in a later fractionation or like system.

The effluent regeneration gas will have a temperature somewhat below the maximum regeneration temperature since it has contacted cooler deactivated catalyst fed through hopper 5. The incoming catalyst may, for example have a temperature of 850 F.–900 F. and will be heated somewhat by contact with the oxygen-free gas escaping through the top of the bed. Thus the temperature of the gas leaving via line 10 may be at about 1050 F.–1100 F. Introduction via line 11 will also serve to bring the catalyst entering the reaction zone to about this temperature even though it may be somewhat above or below it, thus ensuring entry of the reactivated catalyst at a temperature slightly, but not too high, above reaction temperature. In this way a portion at least of the endothermic heat lost during the conversion reaction may be compensated for.

The conversion reaction utilized, for example, for catalytic cracking of a light gas oil, may be carried out in vapor phase at a temperature of 750 F.–1050 F., a pressure of 0–100 pounds per square inch gauge and a space velocity of 0.2–5.0 liquid volumes of feed per volume of catalyst space per hour. A catalyst flow rate of 2–10 barrels per hour per ton of catalyst in the bed has been found to be satisfactory. Cracking or other treatment of other types of stocks may be carried out at temperatures in the range of 700 F.–1150 F., other conditions being similar to those described above.

We claim:

1. In a process for the catalytic conversion of hydrocarbons in which the catalyst is deactivated by deposition of carbon thereon and in which a moving catalyst bed flows through successive conversion and regeneration zones, the method which comprises flowing a stream of oxygen-containing gas at combustion temperature through said regeneration zone countercurrent to said catalyst bed in an amount such that the oxygen in said gas will be substantially completely reacted with the carbon on the catalyst in said regeneration zone but sufficient to permit substantially reactivated catalyst to leave said zone, removing the substantially oxygen-free combustion gas so formed from said zone, flowing said reactivated catalyst through a regenerated catalyst purging zone which is in open communication with said regeneration zone, flowing a portion of said oxygen-free combustion gas through said purging zone in countercurrent to said reactivated catalyst whereby said gas together with purged products are carried into the regeneration zone and become admixed with the regenerating gas, flowing said reactivated and purged catalyst through said conversion zone in countercurrent to a stream of hydrocarbon to be converted, under conversion conditions, removing conversion products from said conversion zone, flowing deactivated catalyst from said conversion zone through a spent catalyst purging zone which is in open communication with said conversion zone, introducing another portion of said oxygen-free combustion gas into said purging zone in countercurrent to said spent catalyst whereby said gas together with purged products are carried into the conversion zone in admixture with the hydrocarbon to be converted.

2. Apparatus for the catalytic conversion of hydrocarbons which comprises a regeneration zone, a regenerated catalyst purging zone in open communication with said regeneration zone, means for flowing catalyst through said regeneration zone and then through said purging zone under combustion conditions, a regeneration gas inlet near the point at which the catalyst leaves the regeneration zone and a spent regeneration gas outlet near the point of entry of the catalyst into said regeneration zone, means for conducting a portion of the spent regeneration gas from its outlet into said purging zone for the removal of combustion products adsorbed by said catalyst and introduction thereof into said regeneration zone, a conversion zone and a spent catalyst purging zone in open communication therewith, means for flowing regenerated and purged catalyst through said conversion zone and then through said spent catalyst purging zone, a hydrocarbon feed inlet near the point of removal of catalyst from said conversion zone and a hydrocarbon conversion product outlet near the point of entry of catalyst into said conversion zone, and means for conducting another portion of the spent regeneration gas through said spent catalyst purging zone for the removal of adsorbed hydrocarbons from said catalyst and introduction thereof into said conversion zone.

3. A process according to claim 1 in which a hydrocarbon oil is catalytically cracked in the conversion zone at a temperature in the range of 700 F.–1150 F.

4. A process according to claim 1 in which the regeneration zone is positioned above the conversion zone thereby permitting catalyst to flow from said regeneration zone to said conversion zone by gravity.

I. LOUIS WOLK.
JOHN D. UPHAM.